US006951412B2

(12) United States Patent
Floyd et al.

(10) Patent No.: US 6,951,412 B2
(45) Date of Patent: Oct. 4, 2005

(54) VOA PIVOT STUD ASSEMBLY

(75) Inventors: Travis S. Floyd, Fishers, IN (US); R. Andrew Kidd, Alexandria, IN (US)

(73) Assignee: Guide Corporation, Pendleton, IN (US)

( * ) Notice: Subject to any disclaimer, the term of this patent is extended or adjusted under 35 U.S.C. 154(b) by 0 days.

(21) Appl. No.: 10/289,883

(22) Filed: Nov. 7, 2002

(65) Prior Publication Data

US 2004/0090786 A1 May 13, 2004

(51) Int. Cl.[7] .............................. F21V 19/02; F21S 8/10

(52) U.S. Cl. ......................... 362/460; 362/421; 362/528

(58) Field of Search ................................ 362/460, 515, 362/289, 330, 427–429, 514, 528, 524, 418, 421, 371

(56) References Cited

U.S. PATENT DOCUMENTS

| | | | | |
|---|---|---|---|---|
| 4,318,161 A | | 3/1982 | Shanks | |
| 4,318,162 A | | 3/1982 | Sip | |
| 4,707,769 A | | 11/1987 | Van Duyn | |
| 4,707,771 A | | 11/1987 | Van Duyn et al. | |
| 4,712,164 A | | 12/1987 | McMahan et al. | |
| 4,761,717 A | | 8/1988 | McMahan et al. | |
| 5,065,293 A | | 11/1991 | Mochizuki | |
| 5,077,642 A | | 12/1991 | Lisak | |
| 5,186,531 A | * | 2/1993 | Ryder et al. | 362/524 |
| 5,197,794 A | | 3/1993 | Scott et al. | |
| 5,337,222 A | | 8/1994 | Shirai et al. | |
| 5,381,317 A | | 1/1995 | Schmitt et al. | |
| 5,678,915 A | | 10/1997 | Shirai et al. | |
| 5,765,897 A | | 6/1998 | Snyder et al. | |
| 5,879,073 A | | 3/1999 | Hori et al. | |
| 5,941,633 A | | 8/1999 | Saito et al. | |
| 5,993,033 A | | 11/1999 | Sugimoto et al. | |
| 6,050,712 A | | 4/2000 | Burton | |
| 6,129,448 A | | 10/2000 | Takasaki et al. | |
| 6,179,510 B1 | | 1/2001 | Meicke et al. | |
| 6,231,223 B1 | | 5/2001 | Zucar et al. | |
| 6,299,335 B1 | * | 10/2001 | Shirai et al. | 362/514 |
| 6,409,221 B1 | | 6/2002 | Robinson et al. | |
| 6,543,916 B2 | * | 4/2003 | Shirai | 362/460 |

FOREIGN PATENT DOCUMENTS

| | | |
|---|---|---|
| EP | 0 384 733 | 8/1990 |
| EP | 0 756 966 A2 | 2/1997 |

* cited by examiner

*Primary Examiner*—Sandra O'Shea
*Assistant Examiner*—Guiyoung Lee
(74) *Attorney, Agent, or Firm*—Ice Miller

(57) ABSTRACT

The present invention comprises a pivot stud with an axis of rotation in the horizontal plane for use within a visual optical aim light assembly. The axis of rotation of the pivot stud defines an axis of rotation about which the light assembly may be rotated so as to properly aim the visual optical aim light assembly. The pivot stub does not allow rotation about planes other than the horizontal plane. According to one embodiment, the pivot stud comprises a ball and socket of a generally ellipsoid shape.

14 Claims, 5 Drawing Sheets

VOA PIVOT STUD ASSEMBLY

BACKGROUND OF THE INVENTION

The present invention relates generally to automotive forward lighting systems and, more specifically, to pivot stud assemblies within headlamp assemblies designed for visual optical aim ("VOA").

Automotive headlamps must meet numerous governmentally mandated regulations. Many of these regulations are related to defining the area in front of an automobile that must be illuminated and describing the intensity of light with which these areas must be illuminated. Thus, after a headlamp is installed on an automobile, it must be adjusted to properly illuminate the critical area in front of the automobile. For one type of headlamps, this adjustment activity involves aiming the headlamp using a process referred to as VOA.

VOA is a method for positioning an installed headlamp so that it is properly aimed for illumination in the area in front of a vehicle. Headlamps known in the art and designed for VOA generally comprise a pair of pivot studs which define an axis of rotation about which the installed VOA headlamp may be moved. Two pivot studs are needed, in part, to ensure that the light assembly is only capable of rotating about the desired axis. After installation, the direction of the light beam emitted by the headlamp is adjusted upwardly or downwardly by using an adjusting mechanism to force rotation of the headlamp about the axis defined by the pivot studs.

The need to incorporate two pivot studs to define an axis of rotation in VOA headlamp assemblies presents significant disadvantages. First, the multiple pivot studs contained within VOA headlamps assemblies add cost to the manufacture of VOA headlamps as a result of greater material needs and increased manufacturing steps leading to increased labor expenses. Second, designers of VOA headlamps have to devote time to creating, or finding, space within a VOA light assembly for multiple pivot studs, thus preventing designers from spending their time on more beneficial projects. A third disadvantage of the pivot studs known in the art is that additional equipment, such as an air driver, is normally required to install pivot studs within a VOA light assembly. The use of an air driver increases the cycle time and, by extension, the manufacturing costs of the VOA light assemblies known in the art.

It is desirable, therefore, to provide a pivot stud that eliminates the need for multiple pivot studs to define a rotational axis in a VOA light assembly without being susceptible to excessive off axis movement. It is further desired that use of the pivot stud result in reduced manufacturing costs associated with VOA headlamp assemblies. Moreover, it is desired that the pivot stud be simple to incorporate into existing assembly lines without the need for additional tools or equipment.

BRIEF SUMMARY OF THE INVENTION

In accordance with the present invention, a single pivot stud assembly is used to define a rotational axis for a VOA light assembly. The pivot stud assembly is generally of the ball and socket type and comprises a joint which allows rotation only about a single axis. According to one embodiment, this is accomplished by providing an ellipsoid ball portion comprising a major axis. The ellipsoid ball is formed such that rotation is allowed about the major axis, thus the major axis defines an axis of rotation. However, excessive movement other than about the major axis is not allowed. According to one embodiment, the pivot stud is connected to the light assembly housing by a keyed socket.

The invention provides a pivot stud assembly that eliminates the need for multiple pivot studs to be used so as to define a rotational axis in a VOA light assembly and is not susceptible to excessive off axis movement. Moreover, the pivot stud assembly results in reduced manufacturing costs because multiple pivot studs are not required. Furthermore, the pivot stud assembly is simple to incorporate into existing assembly lines without the need for additional tools or equipment.

DETAILED DESCRIPTION OF THE INVENTION

Figure 1:
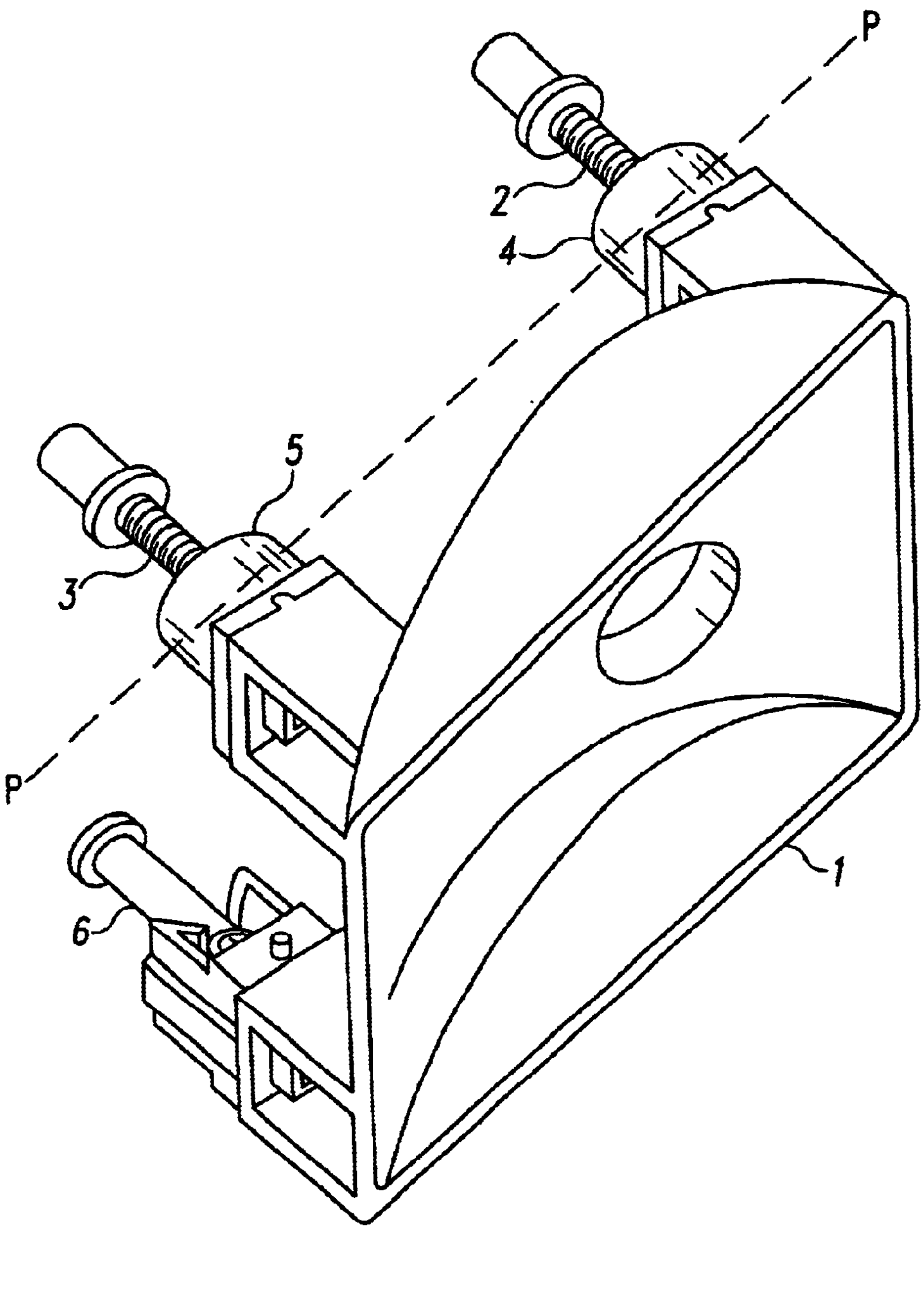
FIG. 1 is a perspective view of a light assembly comprising prior art pivot studs.

FIG. 1 is a perspective view of a light assembly comprising pivot studs known in the art. Reflector 1 is connected to a light assembly housing (not shown) by pivot studs 2 and 3. Pivot studs 2 and 3 include a ball shaped tip which is held within grips 4 and 5. Grips 4 and 5 are formed such that pivot studs 2 and 3 fit snugly within grips 4 and 5, yet the respective ball shaped tips are allowed to rotate within grips 4 and 5. Accordingly, rotation is allowed about axis P. Rotation of reflector 1 is effected by means for aiming 6, which is designed to move in a horizontal path, thus forcing reflector 1 to rotate about axis P.

Figure 2:
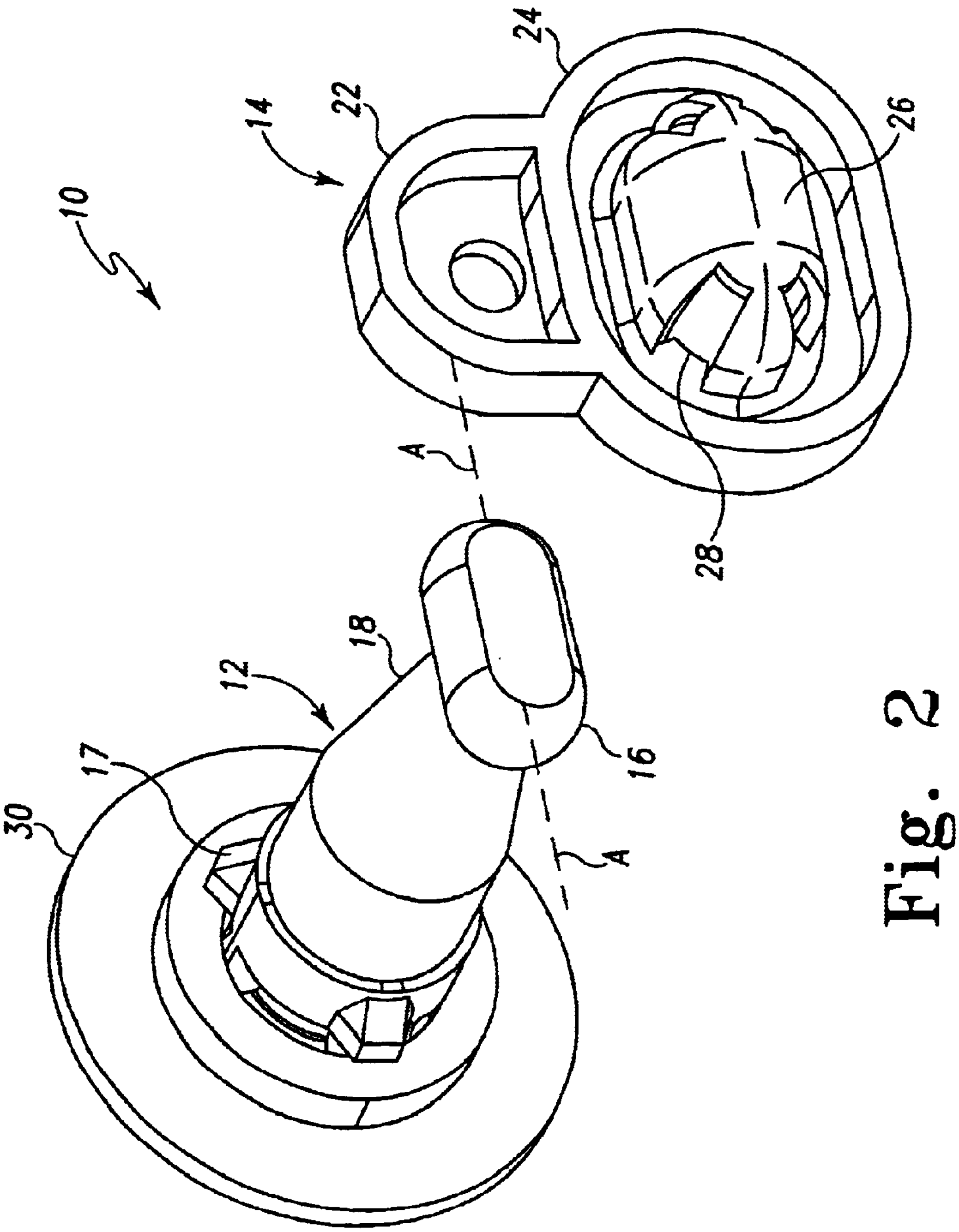
FIG. 2 is a perspective view of a pivot stud assembly in accordance with an exemplary embodiment of the present invention.

FIG. 2. is a perspective view of an exemplary embodiment of a of pivot stud assembly of the present invention. As shown in FIG. 1, pivot stud assembly 10 comprises two members, stud 12 and socket 14. Stud 12 comprises ellipsoid ball 16 and post 18. Post 18 in this embodiment is configured as a key so as to fit into socket 30, which is located within the housing of a light assembly (not shown). Those of skill in the art will recognize that the present invention may be used with any acceptable means of attaching stud 12 to the light assembly, including, but not limited to, the use of threads, or clips, or forming the stud integrally with the light assembly housing. These and other variations are within the scope of the present invention.

Continuing now with FIG. 1, socket 14 comprises mounting tab 22 and ellipsoid socket portion 24. Ellipsoid socket portion 24 comprises chamber 26 and a plurality of tabs 28. Tabs 28 and chamber 26 are fashioned so as to mate with ellipsoidal ball 16. When mated, ellipsoidal ball 16 is held snugly within chamber 26 by tabs 28. In this embodiment, a uniformly rounded surface is realized by the round shape of ellipsoidal ball 16 about axis A. Thus, even when ellipsoidal ball 16 is mated with socket 14, socket 14 is able to be rotated about ellipsoidal ball 16 about axis A. However, because the joint realized by mating ellipsoidal ball 16 with socket 14 is not uniformly rounded about any other axis, movement about any other axis is not allowed. Accordingly, by use of a single pivot stud, a joint is realized which only allows rotation about a single axis.

Continuing with a description of socket 14, mounting tab 22 is used to attach socket 14 to the reflector of a light assembly (not shown). Those of skill in the art will recognize that the present invention may be used with any acceptable means of attaching socket 14 to the reflector of a light assembly, including, but not limited to, the use of threads or clips, or forming the socket integrally with the reflector. These and other variations are within the scope of the present invention.

Figure 3:
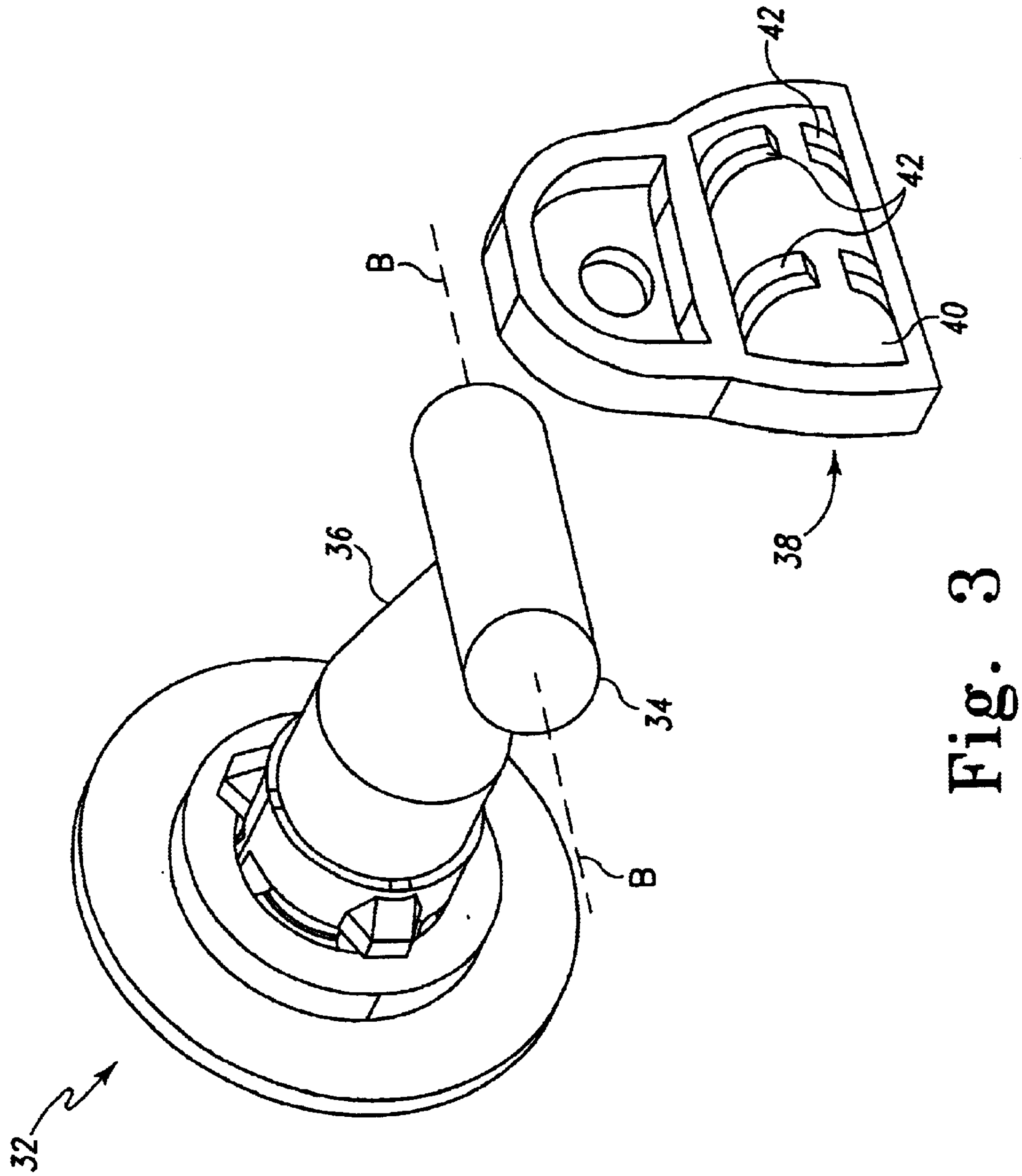
FIG. 3 is a perspective view of an alternative embodiment of a pivot stud comprising a tubular ball in accordance with the present invention.

Referring now to FIG. 3, a perspective view of an alternative embodiment of a pivot stud according to the present invention is shown. Pivot stud 32 comprises tubular ball 34 and post 36. Tubular ball 34 is rounded about axis B. Tubular socket portion 38 comprises chamber 40 and a plurality of tabs 42. Tabs 42 and chamber 40 are fashioned so as to mate with tubular ball 34. When mated, tubular ball 34 is held snugly within chamber 40 by tabs 42. In this embodiment, a uniformly rounded surface is realized by the round shape of tubular ball 34 about axis B. Thus, even when tubular ball 34 is mated with socket 38, socket 38 is able to be rotated about tubular ball 34 about axis B. However, because the joint realized by mating tubular ball 34 with socket 38 is not uniformly rounded about any other axis, movement about any other axis is not allowed. Accordingly, by use of a single pivot stud, a joint is realized which only allows rotation about a single axis.

Figure 4:
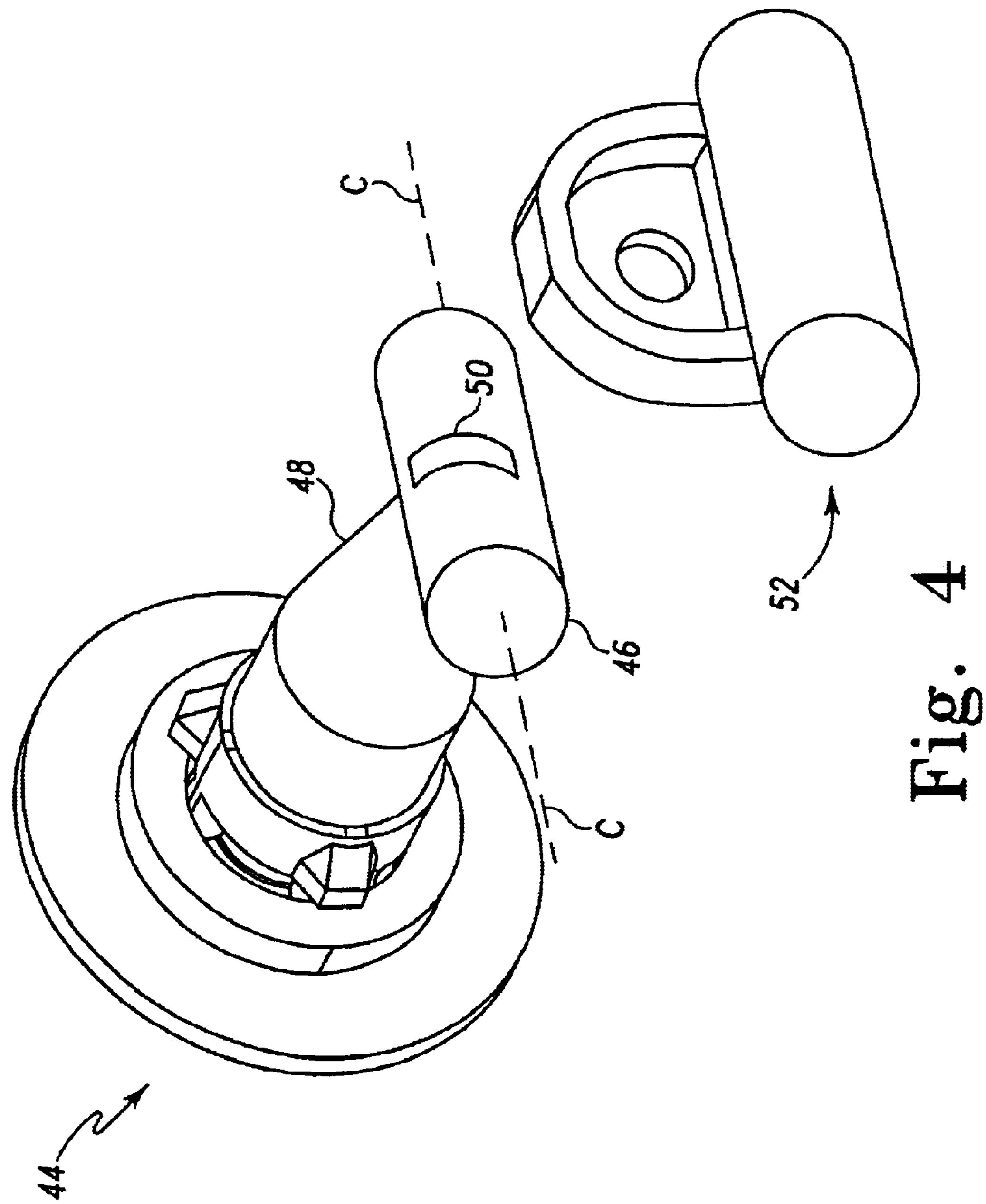
FIG. 4 is a perspective view of an alternative embodiment of a pivot stud using a tubular ball with a slot in accordance with the present invention.

Referring now to FIG. 4, a perspective view of a further alternative embodiment of a pivot stud according to the present invention is shown. Pivot stud 44 comprises tubular ball 46 and post 48. Tubular ball 46 is rounded about axis C. Tubular ball 46 comprises slot 50 which is used in this embodiment to maintain tubular ball 46 snug against socket 52. This is shown more clearly in reference to FIG. 5.

Figure 5:
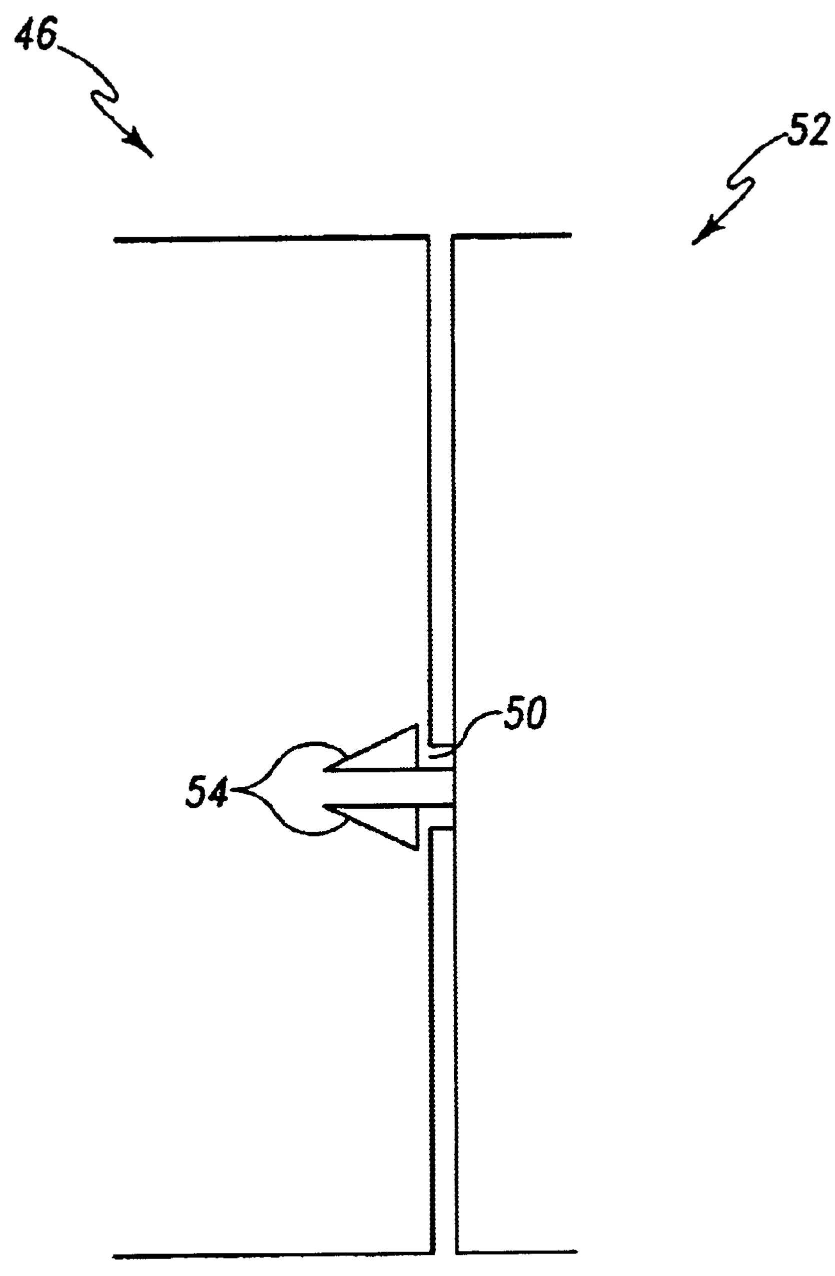
FIG. 5 is a partial cutaway plan view of the pivot stud of FIG. 4 engaged with a socket according to the present invention.

FIG. 5 is a partial cutaway plan view pivot stud 44 engaged with socket 52. Socket 52 comprises tabs 54 which are sized such that when compressed together, they fit within slot 50 of tubular ball 46. Tabs 54 are constructed of resilient material as is well known in the art, such that once inserted into slot 50, they uncompress, and engage tubular ball 46 so that tubular ball 46 and socket 52 are held in a position close to each other. If desired, a plurality of slots and tabs may be used to provide additional rigidity to the mated pivot stud assembly. Those of skill in the art will recognize that a variety of joints may be used in practicing the present invention. By way of example, but not of limitation, it may be desired to fashion the pivot stud assembly with axles and wheels. The salient characteristic, is that the joint allows rotation only about a single axis.

Returning to FIG. 4, a uniformly rounded surface is realized by the round shape of tubular ball 46 about axis C. Thus, when tubular ball 46 is mated with socket 52, socket 52 is able to be rotated about tubular ball 46 about axis C. However, because the joint realized by mating tubular ball 46 with socket 52 is not uniformly rounded about any other axis, movement about any other axis is not allowed.

Those of skill in the art will recognize that a pivot stud assembly according to the present invention eliminates the need for multiple pivot studs to define a rotational axis in a VOA light assembly while eliminating excessive off axis movement. Moreover, a pivot stud according to the present invention reduces manufacturing costs associated with VOA headlamp assemblies by reducing the number of parts required as well as by reducing the number of manufacturing steps involved in attaching the VOA pivot stud assembly. Finally the pivot stud assembly is easily incorporated into existing assembly lines without the need for additional tools or equipment.

While the present invention has been described in detail with reference to certain exemplary embodiments thereof, such are offered by way of non-limiting example of the invention, as other versions are possible. By way of example, but not of limitation, in certain applications it may be desired to attach the socket to the light assembly housing and to attach the pivot stud to the reflector. It is anticipated that a variety of other modifications and changes will be apparent to those having ordinary skill in the art and that such modifications and changes are intended to be encompassed within the spirit and scope of the invention as defined by the following claims.

We claim:

1. A pivot stud assembly for use in a light assembly comprising a housing and a reflector, the pivot stud assembly comprising:

a first member suitable for mounting to one of either the housing or the reflector, the first member having a ball of a generally ellipsoid shape with a first axis and a second axis, and a socket suitable for mounting to one of either the housing or the reflector so that the socket is placed opposite of the first member, the socket being sized to receive and engage the ellipsoid ball of the first member to form a joint which allows rotation only about the first axis, such that when the ellipsoid ball is engaged with the socket, and the pivot stud assembly is installed into a light assembly having an aim point, rotation of the light assembly about the first axis causes the light assembly aim point to move in the vertical plane, and such that when the ball is engaged with the socket, and the pivot stud assembly is installed into a light assembly having an aim point, the aim point of the light assembly cannot rotate about the second axis.

2. The pivot stud assembly of claim 1, wherein the first member further comprises a key such that the first member may be attached to a keyed socket in the light assembly housing or reflector.

3. The pivot stud assembly of claim 1, wherein the ellipsoid ball of the first member has a slot cut into the ellipsoid ball's surface and the socket further comprises at least one tab that is inserted into and located within the slot when the joint is formed, so that the ellipsoid ball is held firmly in place and cannot be moved from the socket.

4. A pivot stud assembly for use in a light assembly comprising a housing and a reflector, the pivot stud assembly comprising:

a first member suitable for mounting to one of either the housing or the reflector, the first member having a ball of a generally cylindrical shape with a first axis and a second axis, and a socket suitable for mounting to one of either the housing or the reflector so that the socket is placed opposite of the first member, the socket being sized to receive and engage the cylindrical ball, such that when the cylindrical ball is engaged with the socket, and the pivot stud assembly is installed into a light assembly having an aim point, rotation of the light assembly about the first axis causes the light assembly aim point to move in the vertical plane, and such that when the ball is engaged with the socket, and the pivot stud assembly is installed into a light assembly having an aim point, the aim point of the light assembly cannot rotate about the second axis.

5. The pivot stud assembly of claim 4, wherein the first member further comprises a key such that the first member may be attached to a keyed socket in the light assembly housing or reflector.

6. The pivot stud assembly of claim 4, wherein the cylindrical ball of the first member has a slot cut into the cylindrical ball's surface and the socket further comprises at least one tab that is inserted into and located within the slot when the joint is formed, so that the cylindrical ball is held firmly in place and cannot be removed from the socket.

7. A method of manufacturing a pivot stud assembly for use in a light assembly comprising a housing and a reflector, the method comprising the steps of:

forming a first member suitable for mounting to one of either the housing or the reflector, the first member having a ball of a generally ellipsoid shape with a first axis and a second axis, and forming a socket suitable for mounting to one of either the housing or the reflector so that the socket is placed opposite of the first member, the socket being sized to receive and engage the ellipsoid ball of the first member to form a joint which allows rotation only about a single axis, such that when the ellipsoid ball is engaged with the socket, and the pivot stud assembly is installed into a light assembly having an aim point, rotation of the light assembly about the first axis causes the light assembly aim point to move in the vertical plane, and such that when the ball is engaged with the socket, and the pivot stud assembly is installed into a light assembly having an aim point, the aim point of the light assembly cannot rotate about the second axis.

8. The method of claim 7, wherein the step of forming the first member comprises, the step of forming at least one key such that the first member may be attached to a keyed socket in the light assembly housing or reflector.

9. The method of claim 7, wherein the step of forming the first member further comprises forming a slot in the ball and the step of forming the socket further comprises forming at least one tab in the socket that corresponds in location to the slot located on the ball.

10. The method of claim 9, further comprising the step of inserting the ball into the socket so that the at least on tab is inserted into the ball's slot.

11. A method of manufacturing a pivot stud assembly for use in a light assembly comprising a housing and a reflector, the method comprising the steps of:

forming a first member suitable for mounting to one of either the housing or the reflector, the first member having a ball of a generally cylindrical shape with a first axis and a second axis, and forming a socket suitable for mounting to one of either the housing or the reflector so that the socket is placed opposite of the first member, the socket being sized being sized to receive and engage the cylindrical ball of the first member to form a joint which allows rotation only about a single axis, such that when the cylindrical ball is engaged with the socket, and the pivot stud assembly is installed into a light assembly having an aim point, rotation of the light assembly about the first axis causes the light assembly aim point to move in the vertical plane, and such that when the ball is engaged with the socket, and the pivot stud assembly is installed into a light assembly having an aim point, the aim point of the light assembly cannot rotate about the second axis.

12. The method of claim 11, wherein the step of forming a first member comprises the step of forming at least one key such that the first member may be attached to a socket in the light assembly housing or reflector.

13. The method of claim 11, wherein the step of forming the first member further comprising forming a slot in the ball and the step of forming the socket further comprises forming at least one tab in the socket that corresponds in location to the slot located on the ball.

14. The method of claim 13, further comprising the step of inserting the ball into the socket so that the at least one tab is inserted into the ball's socket.

* * * * *